United States Patent [19]

DeCore et al.

[11] Patent Number: 4,783,087
[45] Date of Patent: Nov. 8, 1988

[54] GASKET ASSEMBLY HAVING A SEALING INSERT MEMBER AND METHOD OF FORMING

[75] Inventors: Robert A. DeCore, Elk Grove Village; Raymond Kartasuk, Lincolnwood, both of Ill.

[73] Assignee: Fel-Pro Incorporated, Skokie, Ill.

[21] Appl. No.: 37,718

[22] Filed: Apr. 13, 1987

[51] Int. Cl.$^4$ .......................... B23P 11/00; F16J 15/12
[52] U.S. Cl. ................................... 277/166; 29/432.1; 29/505; 29/521; 29/525; 277/181; 277/233; 277/235 B
[58] Field of Search .............. 277/235 B, 235 R, 231, 277/233, 181, 166; 29/432, 432.1, 505, 521, 525, 156.6, 156.61

[56] References Cited

U.S. PATENT DOCUMENTS

| | | | |
|---|---|---|---|
| 1,917,214 | 7/1933 | Bailey | 277/234 X |
| 3,079,681 | 3/1963 | Fentiman | 29/525 |
| 3,177,915 | 4/1965 | La Fleur et al. | 29/432.1 X |
| 3,231,289 | 1/1966 | Carrell | 277/166 X |
| 3,565,449 | 2/1971 | Ascencio et al. | 277/235 B |
| 3,874,675 | 4/1974 | Belter et al. | 277/235 B X |
| 4,254,963 | 3/1981 | Skrycki | 277/235 B X |
| 4,312,512 | 1/1982 | Conte et al. | 277/235 B |
| 4,400,000 | 8/1983 | Moerk, Jr. | 277/166 X |
| 4,405,138 | 9/1983 | Skrycki | 277/233 B |
| 4,535,996 | 8/1985 | Cardis et al. | |
| 4,535,999 | 8/1985 | Locacius | |

*Primary Examiner*—Allan N. Shoap
*Attorney, Agent, or Firm*—Dressler, Goldsmith, Shore, Sutker & Milnamow, Ltd.

[57] ABSTRACT

A gasket assembly comprising a main gasket body and a sealing insert member retained within an opening in the body is disclosed, as is a method of making the assembly. The sealing insert member, which may comprise a sealing grommet or the like, is provided with a plurality of star-like deformable tabs at the outer periphery thereof, with each of the tabs initially formed in a generally dished configuration. The opening in the gasket body which receives the insert member includes a plurality of tab-receiving apertures at the outer edge thereof, with each of the deformable tabs respectively received within one of the apertures. Upon positioning of the insert member within the opening, each of the deformable tabs is deformed, such as by swaging between associated punches, whereby each tab is flattened and urged into engagement with the associated gasket body for retention of the sealing insert member in position.

5 Claims, 1 Drawing Sheet

GASKET ASSEMBLY HAVING A SEALING INSERT MEMBER AND METHOD OF FORMING

TECHNICAL FIELD

The present invention relates generally to sealing gasket assemblies adapted for positioning between a pair of confronting surfaces, and more particularly to a gasket assembly including a sealing insert member held in position within the assembly by a plurality of deformed tabs engaged with the main gasket body.

BACKGROUND OF THE INVENTION

Gasket assemblies are widely used for effecting sealing between a pair of associated confronting surfaces, such as in internal combustion engines and like machinery. For such applications, it is sometimes necessary to provide a metallic or metallic-cored sealing element within the associated main gasket body. For example, commonly assigned U.S. Pat. No. 4,535,999 illustrates a gasket assembly which includes a grommet having a metallic core, wherein the grommet is held in position within the main gasket body by a plurality of circular eyelets. By this construction, the grommet can be first formed separately from the main gasket body, and then firmly secured in position within an opening defined by the main body so that the grommet effects sealing of associated confronting surfaces in the region of the opening.

In view of the widespread use of sealing gasket assemblies, and the preferred practice of replacing such assemblies on a regular basis, as attendant to maintenance, it is desirable to provide a gasket assembly having a sealing insert member such as a grommet which can be efficiently formed for economical use.

SUMMARY OF THE INVENTION

The present invention concerns a gasket assembly, and a method of making the assembly, wherein the assembly includes a sealing insert member such as a grommet positioned within an opening defined by a main gasket body of the assembly. Notably, this sealing insert member includes at least one, and preferably a plurality, of deformable tabs at the periphery thereof, with each deformable tab including a plurality of outwardly extending, upturned deformable projections. The opening in the gasket body which receives the insert member preferably includes a plurality of tab-receiving apertures at the outer edge thereof, with the deformable tabs of the insert member respectively received in the apertures. To effect assembly, the deformable tabs are swaged or otherwise deformed from a generally dished configuration to a generally flat configuration, whereby the deformable projections of the tabs are urged into engagement with the associated main gasket body for retaining the sealing insert member in position therein.

In the illustrated embodiment, the gasket assembly comprises a head gasket for an internal combustion engine, and is adapted to be positioned between a pair of surfaces respectively defined by the engine block and associated cylinder head of the engine. The assembly includes a main gasket body, which in the illustrated embodiment comprises a lamination of a central metallic core, and a pair of compressible facing layers laminated to opposite expansive surfaces of the core. The main gasket body defines a plurality of openings which extend therethrough, which in a typical application would be positioned in association with the cylinder bores of the engine, as well as oil and coolant passages thereof.

The gasket assembly further includes a sealing insert member, which may comprise a sealing grommet, with the insert member positioned in one of the openings defined by the main gasket body. The sealing insert member preferably comprises metallic material, and may be provided with elastomeric material on its sealing faces to enhance the sealing effected with the associated surfaces between which the gasket assembly is positioned and compressed.

Notably, secure retention of the sealing insert member in position within its opening is effected by the provision of at least one, and preferably a plurality of deformable tabs formed integrally at the outer periphery of the metallic insert member. Each tab is preferably formed in a generally star-like configuration, and thus includes a generally circular central portion, from which extends a plurality of deformable projections.

In the illustrated embodiment, the opening in the gasket body which receives the insert member includes a plurality of tab-receiving apertures at the outer edge thereof. Attendant to positioning of the insert member within its opening in the main gasket body, each of the deformable tabs is positioned within a respective one of the tab-receiving apertures. Prior to positioning of the insert member in this manner, each of the deformable tabs is suitably shaped to a preferably generally dished configuration, whereby the deformable projections of the tab are upturned and extend generally angularly from the central portion thereof. In this relative orientation, the outer dimension of each tab, including its projections, is generally equal to or less than the inside dimension of the associated tab-receiving aperture.

After the insert member is positioned within its opening such that its tabs are received within their respective apertures, each of the tabs is deformed, such as by swaging by disposition between a pair of cooperating punches, whereby each tab is deformed from its generally dished configuration to a generally flat configuration. Attendant to this action, the projections of the tab are urged into engagement with the main gasket body, thus effecting secure retention of the sealing insert member within the gasket body. Depending upon the composition of the gasket body and the insert member, the deformed projections may penetrate the gasket body, or be held in interference-like relationship therewith.

Other features and advantages of the present invention will become readily apparent from the following detailed description, the accompanying drawings, and the appended claims.

DETAILED DESCRIPTION

Figure 1:
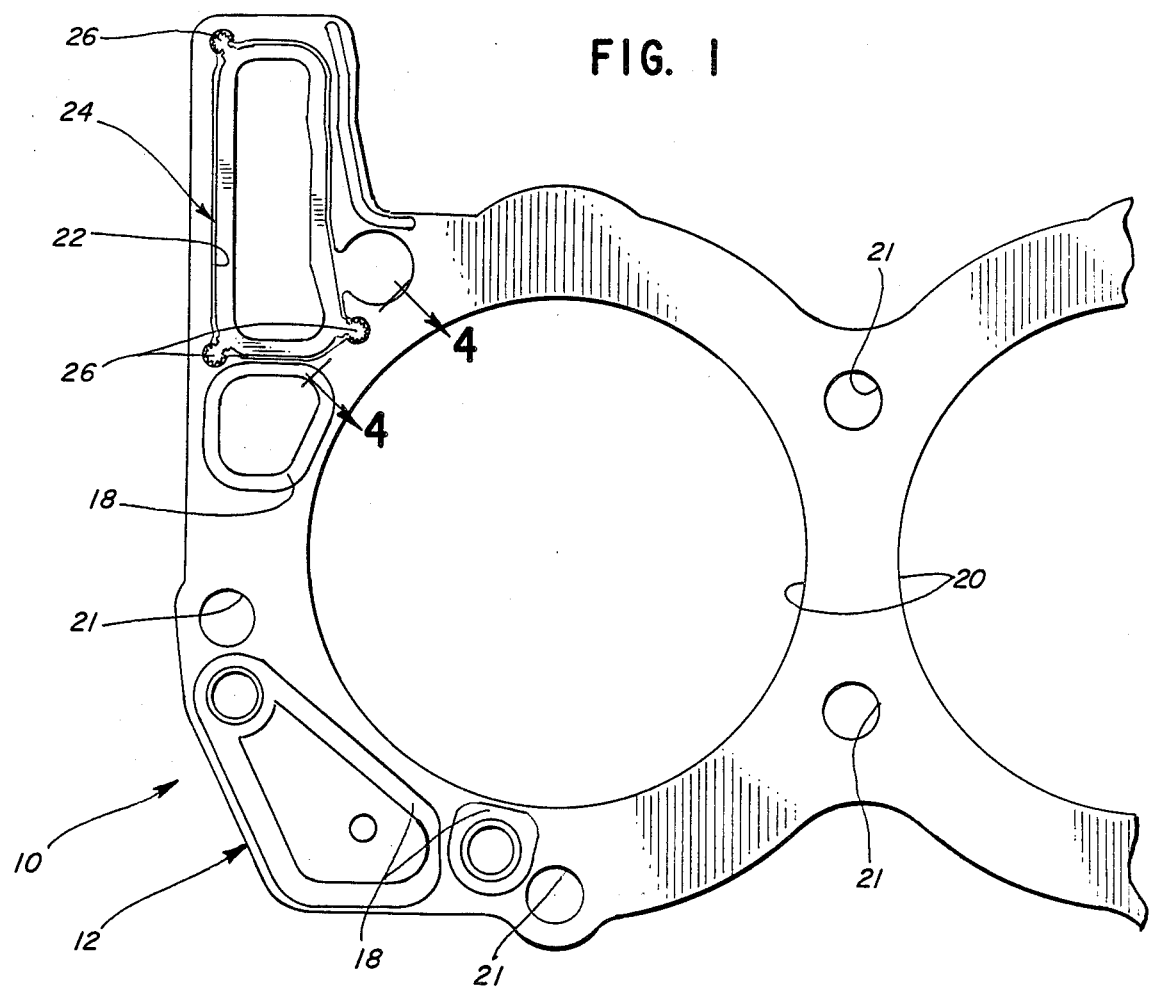
FIG. 1 is a partial top plan view of a gasket assembly, illustrated as a head gasket assembly, embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring now to the drawings, therein is illustrated a presently preferred gasket assembly 10 embodying the principles of the present invention. As will be recognized by those familiar with the art, a gasket assembly such as 10 is adapted for positioning between a pair of associated confronting surfaces to be sealed, and is adapted to be compressed therebetween.

In the partial plan view of FIG. 1, gasket assembly 10 is shown as comprising a head gasket assembly for an internal combustion engine wherein the surfaces between which the assembly is positioned are respectively defined by the engine block and cylinder head of the engine. In such an arrangement, the gasket assembly 10 includes a main gasket body 12 which may be a laminate, and which in the illustrated embodiment comprises three gasketing layers laminated in a conventional fashion to each other, including a generally flat, solid, central expansive metallic layer or core 14, and a pair of generally flat expansive compressible facing layers 16, 16 laminated to respective opposite surfaces of the metallic core 14 (see FIGS. 3 and 4).

The facing layers 16, 18 are typically formed of a composite, compressible gasket facing material, and may be fiber reinforced. These layers are ordinarily laminated mechanically or adhesively to the surfaces of the metallic core 14, such as by suitable heat-activated adhesives, including phenolic-nitrile rubber and polybutyral rubber. The facing layers may include asbestos, glass fibers, or other suitable fibrous materials, and may utilize nitrile, neoprene, or polyacrylic elastomers as a binder. In a typical laminated construction such as illustrated, the central metallic core 14 (which may comprise cold-rolled steel) typically has a thickness on the order of 0.015 to about 0.040 inches, while each of the facing layers 16, 18 may have a thickness on the order of 0.010 to about 0.035 inches.

In the illustrated embodiment, gasket assembly 10 is shown as including a plurality of sealing beads 18 applied to the outer expansive surface of the upper facing layer 16. These sealing beads are typically applied in those zones in which increased or augmented sealing forces or supplemental seals are required. Such sealing beads may be formed of a silicone sealant and applied such as by a silk screening process (see U.S. Pat. No. 3,477,867).

When the present gasket assembly 10 is configured for use as a head gasket in an internal combustion engine, it is necessary that the main gasket body 12 define a plurality of openings which are positioned in alignment with the combustion cylinders, oil and coolant passages, and bolt holes of the associated engine. Thus, gasket assembly 10 is illustrated in FIG. 1 as including cylinder openings 20, bolt holes 21, as well as additional openings as may be required in a typical application.

In this regard, the main gasket body 12 defines an insert opening 22 within which a sealing insert member 24 is positioned, in accordance with the principles of the present invention. Insert opening 22 is formed such as for alignment with an associated oil or coolant passage, with the sealing insert member 24 provided generally in the form of a grommet for effecting sealing at the passage.

Figure 2:
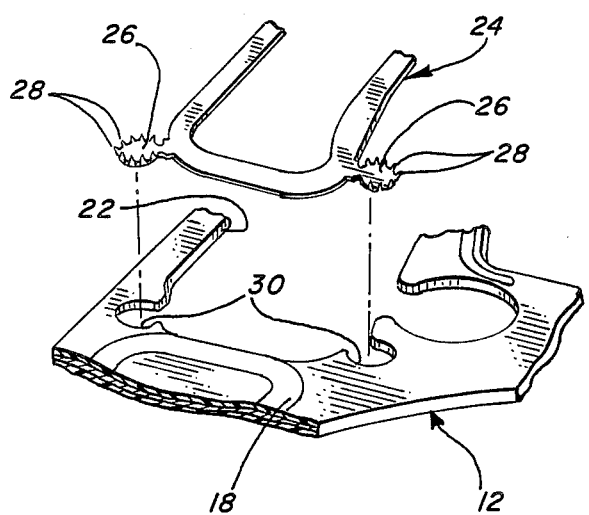
FIG. 2 is a fragmentary perspective view of the present gasket assembly illustrating a sealing insert member thereof prior to positioning within an opening defined by a main gasket body of the assembly.

With particular reference to FIG. 2, the sealing insert member 24 is formed from metallic material, and although not illustrated, may be provided with a suitable sealing elastomer applied thereto. As will be appreciated, it is desirable that the insert member 24 be retained within its respective opening 22 attendant to packaging, shipment, storage, and installation of the gasket assembly 10. To this end, and in accordance with the present invention, the insert member 24 is provided with at least one, and preferably a plurality of deformable tabs 26 formed integrally at the outer periphery of the insert member 24. In the preferred form, each of the tabs 26 has a generally star-like configuration, and includes a generally circular central portion from which a plurality of deformable projections 28 extend generally radially outwardly and upwardly.

In order to effect retention of the insert member within its opening 22, each of the tabs 26 is initially formed such that the projections 28 thereof extend generally upwardly from the central portion of the tab, preferably with all of the projections 28 extending such that the tab 26 has a generally dished configuration. As illustrated, the opening 22 which receives the insert member 24 is defined by the main gasket body to include one or more tab-receiving apertures 28 generally at the outer edge of the opening. Each tab 26 is configured to be positioned within a respective one of the tab-receiving apertures 30, with the outside dimension of each dished tab being generally equal to or less than the inside diameter of its respective aperture 30. As diagrammatically illustrated in FIG. 2, the insert member 24 can be positioned within the opening 22 attendant to disposition of each of tabs 26 within the respective apertures 30.

Figure 3:
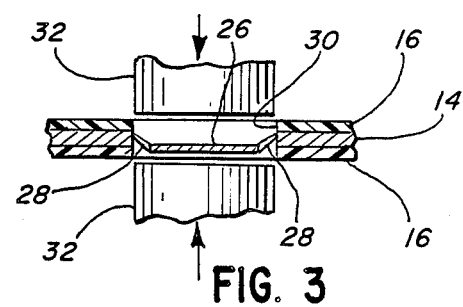
FIG. 3 is a partial cross-sectional view on a relatively enlarged scale illustrating swaging deformation of the sealing insert member shown in FIG. 2 and ready for retention of the sealing insert member within an opening defined by the main gasket body.
Figure 4:
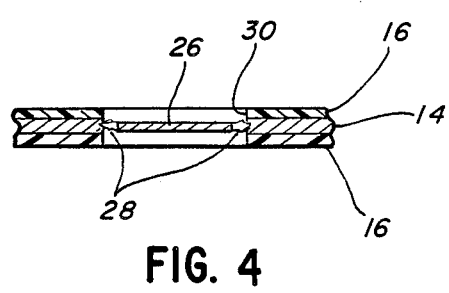
FIG. 4 is a view similar to FIG. 3 taken generally along lines 4—4 of FIG. 1 illustrating retention of the sealing insert member within the associated main gasket body.

Referring particularly now to FIGS. 3 and 4, each of the deformable tabs 26 is now worked, such as by swaging between a pair of cooperating punches 32, so that each tab is deformed from its generally dished configuration (FIG. 3) to a generally flat configuration (FIG. 4) as the deformable projections 28 thereof are deformed and urged into engagement with main gasket body 12. As illustrated, punches 32 are preferably sized to have an outer dimension less than the inside dimension of the tab-receiving apertures 30 to assure the desired contact between the punches and the deformable tabs 26. Depending upon the materials from which the insert member and the main gasket body are formed, the projections 28 may substantially penetrate the gasket body, or may be urged into interference-like engagement with the main body. In the illustrated embodiment, wherein the main gasket body includes the metallic central core 14, projections 28 are illustrated in FIG. 4 as engaging the metallic core with an interference-like fit, with some penetration of the projections into the core as may typically occur.

After "straightening" or "flattening" of each deformable tab 26, including the projections 28, from its generally dished configuration by the action of punches 32 or like equipment, the sealing insert member 24 is firmly held in position within the main gasket body 12 against dislodgement attendant to handling, shipment, storage, and installation. Thus, upon installation between the associated confronting surfaces of an internal combustion engine, or other piece of machinery for which the gasket assembly is configured, the insert member 24 is positively held in position for the desired alignment with associated passages and the like.

It will be apparent from the foregoing that further embodiments of this invention may be made without departing from the spirit and scope of the invention. Accordingly, the scope of the invention is to be considered as being limited only insofar as may be necessary by the claims.

What is claimed is:

1. A gasket assembly adapted to be positioned between a pair of surfaces to be sealed and to be compressed therebetween, said gasket assembly comprising:
   a main gasket body comprising an expansive central metallic core, said main gasket body defining a plurality of openings; and
   a sealing insert member of metallic material positioned in at least one of said openings defined by said main gasket body, said sealing insert member including at least one deformable tab means at the outer periphery thereof positioned within said opening, said tab means being engaged with the main gasket body for retaining said sealing insert member in position within said one opening of said main gasket body,
   and wherein said deformable tab means comprising a plurality of deformed projections at the periphery thereof, said one opening defined by said main gasket body including a tab-receiving aperture in which said deformable tab means is disposed to retain said sealing insert member in position within said one opening, with said projections of said tab means being swaged into engagement with said main gasket body, and said swaged projections of said tab means being engaged with said central metallic core of said main gasket body.

2. A gasket assembly adapted to be positioned between a pair of surfaces to be sealed and to be compressed therebetween, said gasket assembly comprising:
   a main gasket body, said main gasket body defining a plurality of openings; and
   a sealing insert member positioned in at least one of said openings defined by said main gasket body, said sealing insert member including at least one deformable tab means at the outer periphery thereof positioned within said opening, said tab means being engaged with the main gasket body for retaining said sealing insert member in position within said one opening of said main gasket body,
   and wherein said deformable tab means comprises a plurality of deformed projections at the periphery thereof, said one opening defined by said main gasket body including a tab-receiving aperture in which said deformable tab means is disposed to retain said sealing insert member in position within said one opening, and said tab means including a generally circular central portion, said projections extending generally radially outwardly therefrom.

3. A method of forming a gasket assembly adapted to be positioned between a pair of surfaces to be sealed and to be compressed therebetween, said method comprising the steps of:
   providing a main gasket body defining a plurality of openings;
   providing a sealing insert member for positioning in one of said openings defined by said main gasket body, including providing said insert member with at least one deformable tab means at the outer periphery thereof;
   positioning said insert member within said one opening defined by said main gasket body so that said deformable tab means is received within said one opening defined by said main gasket body; and
   deforming said deformable tab means into engagement with said main gasket body at said one opening to thereby retain said sealing insert member in position within said one opening of said main gasket body, and wherein said deformable tab means comprises a plurality of deformable projections at the outer periphery thereof, said one opening defined by said main gasket body including a tab-receiving aperture in which said deformable tab means is positioned during said positioning step, and
   providing said deformable tab means in a generally dished configuration such that said projections extend generally upwardly from a central portion of said tab means prior to said deforming step.

4. A method of forming a gasket assembly adapted to be positioned between a pair of surfaces to be sealed and to be compressed therebetween, said method comprising the steps of:
   providing a main gasket body defining a plurality of openings;
   providing a sealing insert member for positioning in one of said openings defined by said main gasket body, including providing said insert member with at least one deformable tab means at the outer periphery thereof;
   positioning said insert member within said one opening defined by said main gasket body so that said deformable tab means is received within said one opening defined by said main gasket body; and
   deforming said deformable tab means into engagement with said main gasket body at said one opening to thereby retain said sealing member in position within said one opening of said main gasket body, and wherein said deformable tab means comprises a plurality of deformable projections at the outer periphery thereof, said one opening defined by said main gasket body including a tab-receiving aperture in which said deformable tab means is positioned during said positioning step, and wherein said deforming step includes swaging said tab means between a pair of cooperating punch means to deform said tab means into engagement with said main gasket body.

5. A method of forming a gasket assembly in accordance with claim 1, wherein
   said cooperating punch means are sized to have an outer dimension less than the inside dimension of said tab-receiving aperture defined by said main gasket body.

* * * * *

UNITED STATES PATENT AND TRADEMARK OFFICE
CERTIFICATE OF CORRECTION

PATENT NO. : 4,783,087
DATED : November 8, 1988
INVENTOR(S) : Robert A. DeCore and Raymond Kartasuk It is certified that error appears in the above-identified patent and that said Letters Patent is hereby corrected as shown below:

Column 6, line 46 insert --insert-- after "sealing"; and

Column 6, line 59, change the numeral "1" to numeral --4--.

Signed and Sealed this

Twenty-eighth Day of March, 1989

Attest:

DONALD J. QUIGG

Attesting Officer

Commissioner of Patents and Trademarks